United States Patent [19]

Stratton

[11] 3,880,124

[45] Apr. 29, 1975

[54] AIR FILTER AND HUMIDIFIER

[76] Inventor: Cleo C. Stratton, 2123 Kern St., San Bernardino, Calif. 92405

[22] Filed: June 21, 1973

[21] Appl. No.: 372,289

[52] U.S. Cl............. 123/25 A; 123/25 R; 123/25 J; 261/92
[51] Int. Cl............................................. F02m 25/02
[58] Field of Search.... 123/25 R, 25 A, 25 B, 25 D, 123/25 P, 25 J, 25 M; 261/18 A, 92

[56] References Cited
UNITED STATES PATENTS

| | | | |
|---|---|---|---|
| 1,289,421 | 12/1918 | Fairbanks | 261/18 A |
| 2,710,665 | 6/1955 | Stratton | 261/92 |
| 3,631,843 | 1/1972 | Yeiser | 123/25 M |

FOREIGN PATENTS OR APPLICATIONS

| | | | |
|---|---|---|---|
| 152,486 | 7/1903 | Germany | 261/92 |

*Primary Examiner*—Charles J. Myhre
*Assistant Examiner*—R. H. Lazarus
*Attorney, Agent, or Firm*—Whann & McManigal

[57] ABSTRACT

An air filtering and humidifying apparatus for use in conjunction with an internal combustion engine. The apparatus is fully automatic, includes an adapter for conveniently interconnecting the device to the air intake of the carburetor of the engine, a receptacle for containing water and a water reservoir for automatically supplying additional water to the receptacle as needed during operation through an interconnecting conduit and valve mechanism.

The receptacle is divided into two communicating chambers, the first of which includes an air intake opening and houses a rotatably mounted perforated drum adapted to controllably introduce water particles into the path of the stream of air flowing through the apparatus. The second chamber receives the filtered air after it has passed through the drum and functions as a precipitation chamber for precipitating out water droplets which may be contained in the air. This second chamber is interconnected with the adapter by means of an air passageway in the form of a duct. There is provided a unique sensor element for sensing the demand for water vapor saturated air by the carburetor and a cooperating control mechanism for precisely controlling the introduction of water particles into the path of the air stream in direct relation to the demand for water saturated air by the carburetor.

13 Claims, 6 Drawing Figures

3,880,124

AIR FILTER AND HUMIDIFIER

BACKGROUND OF THE INVENTION

1. Field of the Invention

This invention relates generally to filtering and humidifying devices and more particularly to air filtering and humidifying devices for use in conjunction with internal combustion engines.

2. Discussion of the Prior Art

In providing a air and fuel mixture for internal combustion engines, it is extremely important to effectively filter from the intake air flowing to the carburetor all foreign particulate material such as dust, dirty and other abrasive materials. Additionally, it has been established that the controlled introduction of water vapor into the air-fuel mixture supplied to an internal combustion engine will markedly improve the performance of the engine. In this regard, tests have shown that best results are obtained when the air delivered to the carburetor is approximately 95 percent saturated at any given temperature. Consequently, an apparatus which will effectively filter the air supply to an internal combustion engine and at the same time will controllably humidify the air is of great potential value in the automotive, trucking, construction, marine and related industries.

In the past, numerous attempts have been made to develop an effective air filtering and humidifying apparatus. One of the most successful of these developments is the device described in the U.S. Letters Pat. No. 2,710,665 issued to Cleo C. Stratton, the inventor of the apparatus described herein. This device, while clearly superior to any similar device on the market, has certain drawbacks. Principal among these is the absence of a sensing and control means in the apparatus which is capable of accurately and efficiently sensing the demand for water saturated air by the carburetor of the engine and in response to this demand, effectively controlling the introduction of water particles into the path of the air flowing through the apparatus in relation thereto. In particular, this prior art device is incapable of responding in a timely manner to rapid increases in the demand by the carburetor for saturated air such as occurs when the engine moves from an idling mode into a mode of rapid acceleration. By failing to introduce sufficient water into the air flow during times of rapid acceleration of the engine, both engine performance and the ability of the device to efficiently filter and humidify the air is degraded. Additionally, since the previous device did not include means for adjusting the impedence offered by the unit to the flow of air to the carburetor, each unit had to be specially constructed for each size of engine with which it was to be used. This was expensive, made mass production of the unit very difficult and seriously aggravated installation problems.

As will be described in detail in the paragraphs which follow, the apparatus of the present invention has overcome the deficiencies of the device previously developed by providing a highly novel and unique combination embodying cooperating sensor and control means for efficiently introducing water particles into the path of the air flowing through the unit in direct relation to the demand for air by the carburetor. Means has also been provided for expeditiously matching the air impedence of the apparatus with the impedence offered by the standard air cleaners provided by the engine manufacturers. This permits a single sized unit to be used interchangeably with engines having a wide horsepower range.

Additional prior art known to the applicant which serves to demonstrate the unique nature and novelty of the present invention is described in the following U.S. Letters Pat. Nos.: 885,905 Averall Apr. 28, 1908; 1,409,593 Schram Mar. 14, 1922; 1,578,611 Sanborn Mar. 30, 1926; 1,899,504 Hanson Feb. 28, 1933.

SUMMARY OF THE INVENTION

It is an object of the present invention to provide a device for use in conjunction with internal combustion engines which will effectively remove from the air flowing into the carburetor of the engine substantially all foreign particulate matter such as dirt, dust and other abrasive materials and at the same time will controllably humidify the air so as to provide air to the carburetor which is substantially saturated with water vapor at all operating temperatures.

It is another object of the invention to provide an air cleaning and humidifying apparatus which is fully automatic, embodies a continuously cleaned filtering element and is easily adjustable so as to match the air restriction or impedence offered by standard air cleaners of the type provided by the manufacturer of the engine.

it is a further object of the invention to provide a device which will effectively humidify the air flowing to the carburetor but will prevent moisture droplets from entering the carburetor.

More particularly, it is an object of the invention to provide a filtering and humidifying apparatus of the class described in the previous paragraphs in which the introduction of water particles into the stream of air flowing through the unit for purposes of cleaning and humidifying the air is carefully controlled and regulated relative to the demand for water vapor saturated air by the carburetor of the internal combustion engine.

It is another object of the invention to provide an apparatus of the type described in the previous paragraphs in which the introduction of water particles into the air stream is regulated through the cooperative interaction of a sensor which senses the demand for moisture laden air by the carburetor and a control mechanism which controls the subassembly adapted to accomplish the physical introduction of water particles into the air stream.

it is still another object of the invention to provide an apparatus of the class described in the previous paragraphs in which the sensor element for sensing the demand for saturated air by the carburetor regulates the control mechanism of the apparatus and also governs the flow path of the air flowing into the apparatus in a manner so as to regulate the degree of impedence offered to the air flowing to the carburetor.

It is yet another object of the invention to provide an apparatus of the aforementioned character which can be inexpensively manufactured, is easily maintained, and can be expeditiously installed on most types of automobile, truck, heavy equipment and marine engines.

In summary, these and other objects of the invention can be met by an air filtering and humidifying apparatus which includes an adapter means for operatively coupling the apparatus to the air intake of the carburetor of an internal combustion engine; a receptacle for containing water which receptacle is divided into first and second communicating chambers and in which the first chamber is provided with an air intake opening; an air passageway interconnecting the adapter and the second chamber of the receptacle; and an air filtering and humidifying means for filtering and humifitying the stream of air flowing through the apparatus. The air filtering and humidifying means includes a perforated drum rotatably mounted within the first chamber of the receptacle; a sensor for sensing the demand for water saturated air at the intake of the carburetor; and a control mechanism operatively interconnected with the sensor for controlling the speed of rotation of the perforated drum.

DESCRIPTION OF THE PREFERRED EMBODIMENTS

Figure 1:
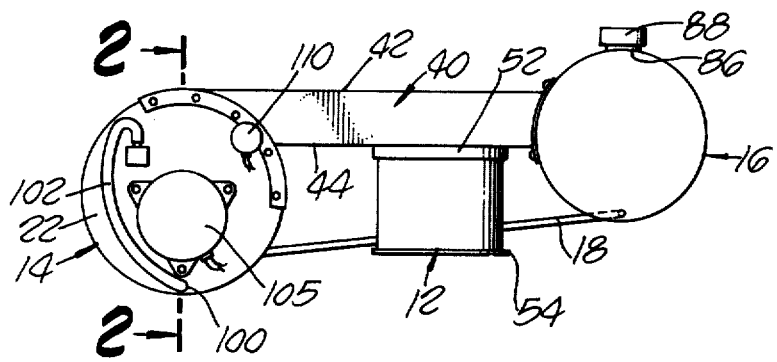
FIG. 1 is a side view of the air filtering and humidifying apparatus of the present invention.
Figure 2:
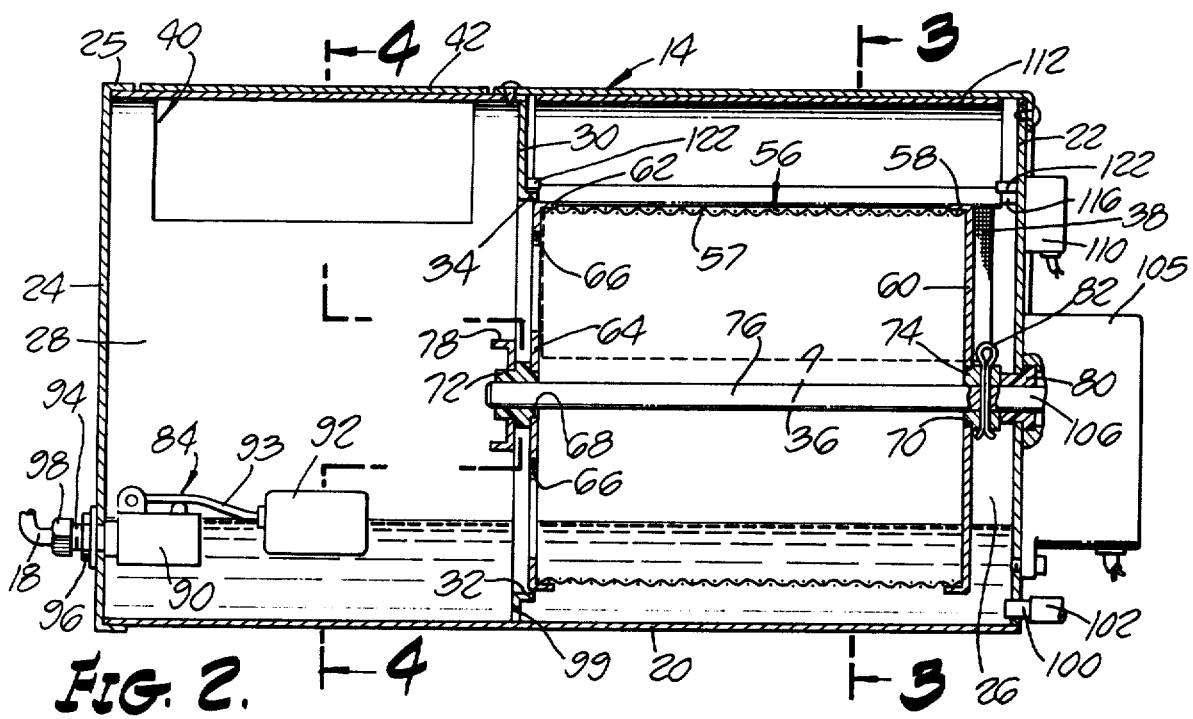
FIG. 2 is an enlarged cross-sectional view taken along lines 2—2 of FIG. 1 illustrating the construction of the water retaining receptacle and the rotatably mounted perforated drum for introducing water particles into the path of the air flowing through the unit.

Turning now to the drawings and particularly to FIGS. 1 and 2, the apparatus of the invention can be seen to comprise an adapter means 12 for interconnecting the apparatus with the air intake of a carburetor of an internal combustion engine, a generally cylindrical receptacle or housing 14 for retaining a water bath in the lower portion thereof, and a water supply reservoir 16 interconnected to receptacle 14 by a conduit 18. Receptacle 14 may be constructed of any suitable sturdy and corrosion-resistant material such as thin gauge galvanized sheet metal or plastic and comprises an outer shell or covering 20 supported by a first, generally circular end panel 22 and a second, generally circular end panel 24 having a circumferential flange 25. The outer shell and the end panels can be joined together by any suitable means such as soldering, crimping or the like. Shell 20 is provided with a longitudinally extending opening in its upper portion to permit assembly of the component parts of the apparatus, and a removable cover member or panel 21 (FIG. 2) is provided to close the opening during operation of the unit.

As can best be seen by referring to FIG. 2, receptacle 14 is divided into first and second communicating chambers 26 and 28, respectively, by a dividing wall 30. Wall 30 is provided with a relatively large axially offset circular opening 32 defined by a flange 34 which extends inwardly into chamber 26.

Figure 3:
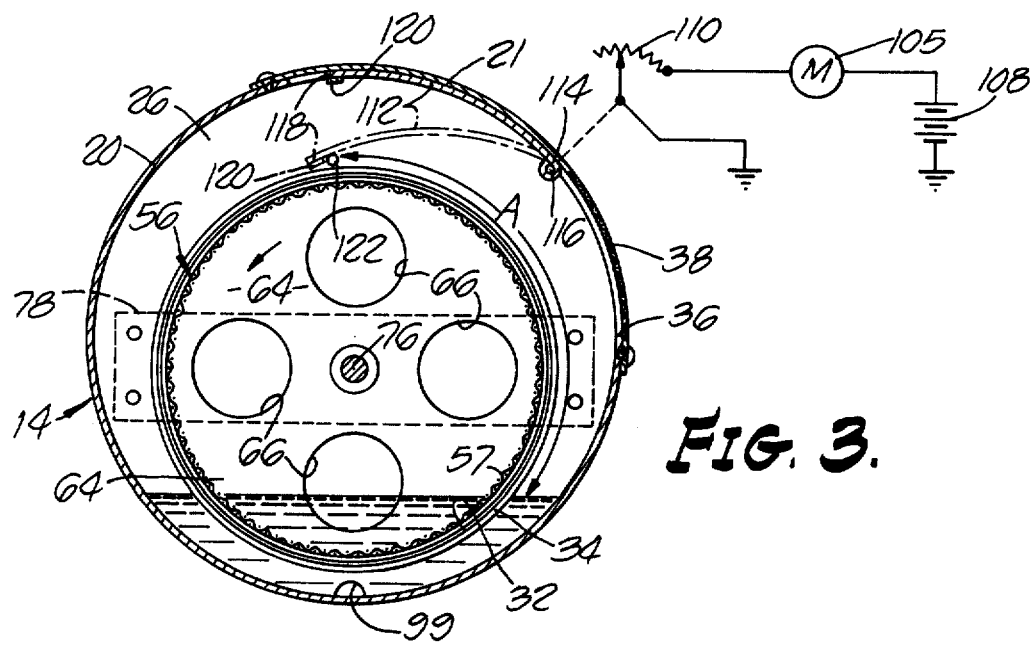
FIG. 3 is a cross-sectional view taken along lines 3—3 of FIG. 2 showing the construction of one form of sensor means of the invention for sensing the demand for air by the carburetor.

As shown in FIGS. 2 and 3, an air intake opening 36 is provided in the apparatus to permit air to flow inwardly from atmosphere into chamber 26. A screen 38 is provided to cover the air intake opening so as to prevent leaves, dirt or other foreign material from entering the apparatus.

Figure 4:
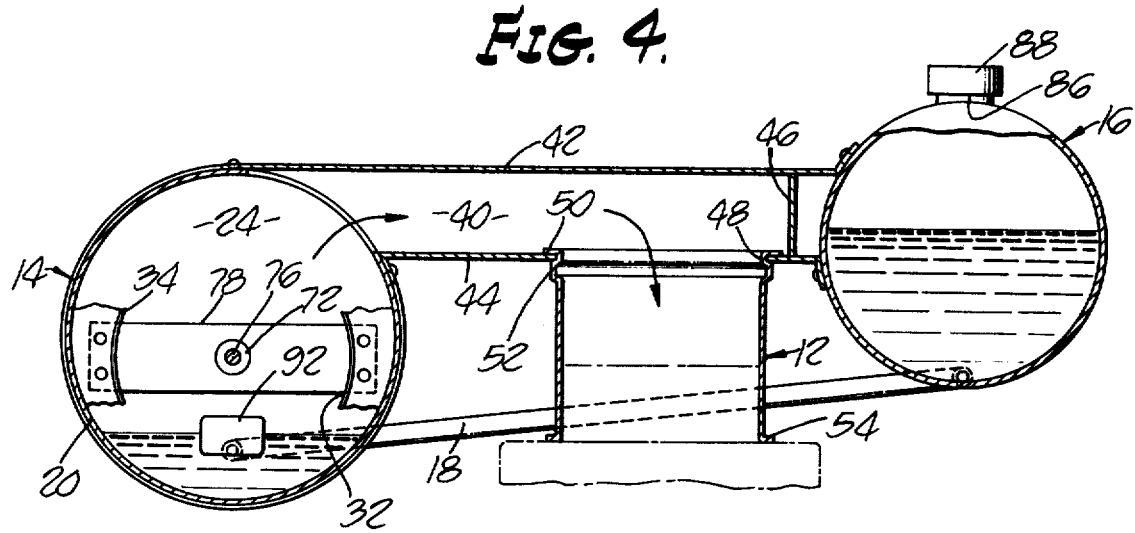
FIG. 4 is a cross-sectional view taken along lines 4—4 of FIG. 2 illustrating the construction of the adapter for interconnecting the apparatus to the carburetor, the construction of the air passageway and the direction of air flow through the unit.

Referring to FIGS. 1, 2 and 4, it can be seen that an air passageway formed by duct 40 inter-connects adapter means 12 and the second chamber 28 of the receptacle. In this embodiment of the invention duct 40 is shown as being arranged generally horizontally and, as shown in FIG. 4, comprises a top wall 42, a bottom wall 44, and an end wall 46 located near the right end of the duct as viewed in FIG. 4. Duct 40 is flanged at its right end to permit interconnection with water reservoir 16 by any suitable means such as screws or rivets. At its open left end, duct 40 is interconnected near the upper end of chamber 28 of receptacle 24 by any suitable means such as rivets or screws. Duct 40 is provided with an opening 48 in its lower wall 44 to accommodate reception of adapter means 12. Adapter means 12 has its upper end formed with a flange 50 and an outwardly pressed portion 52 spaced from the flange and forming a recess in which the adjacent edge portion of opening 48 in duct 40 is secured. The lower end of adapter means 12 is provided with an outturned flange 54 which rests on the inlet or intake section of the carburetor of the internal combustion engine. The apparatus can be removably attached to the carburetor by means of ring clamps, straps or other suitable means depending upon the configuration of the particular carburetor. As shown in FIGS. 2 and 3, housed within chamber 26 of receptacle 14 is a porous or perforated drum 56 rotatably mounted within first chamber 26 and interposed in the path of air flow between the air intake opening 36 of first chamber 26 and second chamber 28. Drum 56, in this form of the invention, comprises a part of the air filtering and humidifying means for controllably introducing particles of water into the path of the air flow through the unit. As illustrated in the drawings, drum 56 is generally cylindrical in shape, has its axis substantially horizontally arranged, and is constructed of a preforated, screen-like, generally cylindrical body portion 57 secured at its outer end to an inturned flange 58 of a generally circular solid end wall 60 and is secured at its opposite end to an inturned flange 62 of a generally circular inner end wall 64 having a plurality of relatively large openings 66 therein, said openings being spaced annularly apart. The perorated body portion 57 may be constructed from various metal or plastic materials and may be of various thicknesses depending upon the installation, but it has been found that a perforated metallic screen material such as copper or steel, approximately 50/1,000 of an inch thick, has proved satisfactory.

Walls 60 and 64 are provided with coaxially aligned openings 68 and 70 located on an axis slightly offset from the axis of receptacle 14. Supported within opening 68 is a bearing 72 and supported within opening 70 is a collar 74. A shaft 76 is rotatably mounted at one end in bearing 68, which bearing is rigidly supported within the apparatus by a channel member 78 affixed to and extending generally horizontally across opening 34 in divider wall 30. The opposite end of shaft 76 is rotatably supported by a bearing 80 carried in end wall 22 of receptacle 14 and located in coaxial alignment with bearing 72. The perforated drum 56 is secured to shaft 76 by any suitable means such as a cotter pin 82 received in aligned openings in collar 74 and shaft 76. With this construction, rotation of shaft 76 will effect rotation of the porous drum unit 56. It is to be noted that the inner end of porous drum 56 is closely received within the flanged opening 34 in divider wall 30 so as to prevent any substantial flow of air between the outer periphery of drum 56 and divider wall 30, while at the same time providing sufficient clearance to permit free rotation of the drum within the apparatus.

Reservoir 16 provides the means for supplying water to receptacle 14 through conduit 18. As best seen in FIG. 2, a valve means generally designated by the numeral 84 is provided for controlling the flow of water through conduit 18 so as to maintain a predetermined water level in the lower portion of receptacle 14. The water level is maintained at a level within the lower portion of drum 56 so that as the drum rotates the screen 57 is immersed in the water. As will be described in greater detail in the paragraph entitled "Operation", as the drum rotates the screen will pick up water particles and interpose them into the path of the stream of air flowing from intake opening 36 through the drum. These particles of water function to effectively clean the air as well as humidify it.

Reservoir 16 may be filled through opening 86 which is normally closed by a cap 88. Turning again to FIG. 2, valve means 84 is shown in this embodiment as comprising a valve 90 and a valve control means or float 92 operatively connected to the valve by an arm 93. Valve 90 is disposed within chamber 28 and has an outwardly projecting externally threaded portion 94 received in an opening provided in wall 24 of receptacle 14. A nut 96 secures the valve to the receptacle and a fitting 98 interconnects the valve with conduit 18.

It is to be appreciated that water can flow freely between chambers 26 and 28 through an opening 99 provided in wall 30. A drain opening generally designated by the numeral 100 is provided in the lower portion of wall 22 for draining the unit through a flexible hose 102.

In order for the apparatus of the present invention to operate properly, it is extremely important that the amount of water introduced into the path of the air stream flowing through the apparatus be precisely controlled relative to the amount of air flowing through the unit at any given time. This is accomplished by controlling the path of flow of air through the apparatus and simultaneously controlling the speed or rotation of the drum 56 of the filtering and humidifying means. As to the speed of rotation of the drum, the faster the drum rotates, the greater will be the quantity of water particles picked up by the screen and introduced into the air stream flowing through the drum. Conversely, when the drum rotates more slowly, a lesser amount of water will be picked up by the screen and carried into the path of the air flow. When the demand for air by the carburetor is great and a large volume of air is flowing through the unit, the speed of rotation of drum 56 must be increased to prevent drying out of the drum and to insure introduction of sufficient water into the path of the air flow to adequately clean and humidify the air. Conversely, when the demand for air by the carburetor is small, as during the idling mode of the engine, the speed of rotation of the drum must be correspondingly decreased. I have found it very important for optimum performance of the apparatus that the speed of rotation of the drum must at all times be closely regulated relative to the amount of air flowing through the unit. It is particularly important, when the engine moves from an idling mode into a power mode, that the speed of rotation of the drum be instantaneously increased to accommodate for the rapid increase in the volume of air flowing through the apparatus into the carburetor. Any appreciable lag in the increase of rotation of the drum adversely affects both engine performance and the filtering and humidifying capability of the apparatus.

To insure accurate and responsive control of the speed of rotation of the drum in relation to the varying demand for moisture laden air by the carburetor, there is provided, as a part of the air filtering and humidifying means of the invention, highly novel and unique sensor means for sensing the demand for air at the intake of the carburetor. Operatively associated with said sensor means there is provided a unique control means for controlling the speed of rotation of the perforated drum 56.

Considering first the control means of the invention, there is included driving means for rotating the drum 56 and cooperating regulating means for regulating the driving means. In this embodiment of the invention the driving means for rotating drum 56 is provided in the form of a variable speed electric motor 105. As best seen in FIG. 2, motor 105 is mounted exteriorly of the apparatus on wall 22 of receptacle 14 and has a drive shaft 106 extending through bearing 80 carried by wall 22. Drive shaft 106 may be coupled with shaft 76 by any suitable means, but for purposes of illustration is shown here as directly coupled to shaft 76 by means of the cotter pin 82. Motor 105 may be of a suitable type of commercially available, variable speed D.C. motor of a class well known in the art. Referring to FIG. 3, motor 105 is operatively interconnected by suitable wiring with a source of electricity 108 and with a regulating means shown here as electrical circuit means in the form of a variable resistor 110. Variable resistor 110 is operatively coupled with and responsive to the sensor means, which in the embodiment shown in FIGS. 2 and 3 comprises a pivotally mounted baffle element 112 which extends longitudinally substantially the entire length of the first chamber 26 of receptacle 14. This baffle element serves the dual function of sensing the demand for air by the carburetor and also controlling the path of flow of the air flowing into the apparatus through intake opening 36. As shown best in FIG. 3, baffle element 112 is pivotally connectd along its outer edge 114 to receptacle 14 by means of pivot pin 116 which is supported by receptacle 14 and is disposed adjacent the upper edge of the air intake opening 36. As illustrated by the phantom lines in FIG. 3, the baffle element is arranged so that it normally depends inwardly into the first chamber 26 intersecting the path of the air flowing into chamber 26 through the intake opening. As indicated by the solid lines, baffle element 112 is movable outwardly toward the inner surface of receptacle 14 in response to the influx of air flowing into the apparatus. As illustrated in FIG. 3, the free edge 118 of baffle 112 will move into and out of juxtaposition with the periphery of porous drum 56 in accordance with the amount of air flowing through the apparatus which, of course, is governed by the demand for air by the carburetor.

A biasing means shown here as a removably affixed weight 120 is provided along the free edge 118 of the baffle element for the purpose of normally urging the free edge of the element into close proximity with the periphery of drum 56. When the internal combustion engine is in the idling mode, a relatively small amount of air is flowing into the apparatus through opening 36 and due to the urging of gravity, the baffle element will depend downwardly into chamber 26 and rest against support pins 122 carried by walls 22 and 30 of receptacle 14. Pins 122 are positioned to support the baffle element so as to prevent it from engaging the drum.

Relative to the air directing function of the baffle element, with the element in the position shown by the phantom lines of FIG. 3, it will obvious that the air flowing into the unit through opening 36 will impinge upon the baffle element in a manner as to cause the air to be directed downwardly into the drum 56 along its entire length. It is to be noted that as long as the free edge 118 of the baffle remains in close proximity with the drum, substantially all of the air will be forced to flow through the limited circumferential area defined at one extremity by the free edge 118 of the baffle 112 and as defined at the other extremity by the water level in the receptacle (arc A indicated in FIG. 3). It is also to be noted that with the baffle element in the at-rest position, as illustrated by the phantom lines, maximum resistance is provided by the variable resistor 110 so that motor 105 will rotatably drive drum 56 at a slow speed of rotation.

Upon acceleration of the internal combustion engine, the demand for air by the carburetor will cause an immediate influx of air into the apparatus through opening 36. This influx of air will impinge upon the baffle element causing it to pivot about pivot pin 116 and to move outwardly in the direction of the solid lines shown in FIG. 3. This pivotal movement of the baffle element has two effects: first, as the baffle swings away from the drum the area of the drum through which air may flow is increased in a manner so as to permit air to flow through the screen 57 substantially throughout the entire periphery of the drum save for that portion which is immersed in the water; second, as a result of the mechanical interconnection between the baffle element and the variable resistor 110, which interconnection can be accomplished in various ways well known in the art, as the baffle element swings upwardly about pivot pin 116, the resistance provided by the variable resistor 110 will be decreased thereby permitting motor 105 to drive the drum 56 at a greater rate of speed of rotation. In this way more water will be picked up by screen 57 and introduced into the path of air flow through the drum. This prevents the increased air flow from drying out the drum and insures efficient filtering and humidification of the air flowing through the apparatus.

As the demand for air by the carburetor decreases, the flow of air through opening 36 will decrease and, due to the urging of gravity, the baffle 112 will tend to move in the direction of the phantom lines in FIG. 3. As previously mentioned, this pivotal movement of the baffle element performs the important function of directing the flow of air through the apparatus and also serves to regulate the impedance offered by the apparatus to the flow of air into the carburetor. As previously mentioned, the movement of the baffle also serves to operate the variable resistor 110 in a manner as to increase the resistance to the motor causing it to drive the drum more slowly.

It is to be understood that since weight 120 is removably affixed to baffle 112, the amount of weight may be easily increased or decreased to adjust the impedence or restriction offered by the apparatus. In this manner the apparatus can be expeditiously adjusted to match the restriction offered by the standard type of air cleaner normally used with the particular engine. In this regard, experience has shown that a single weight of on the order of three or four ounces is satisfactory for engines having a horsepower of up to 200. For engines having a horsepower of between 200 and 400, a second weight of on the order of five or six ounces is satisfactory. For certain applications where precise performance may be desired, however, it is to be understood that weight 120 can be easily varied to match exactly the recommended air cleaner restriction recommended by the manufacturer of the engine.

Figure 5:
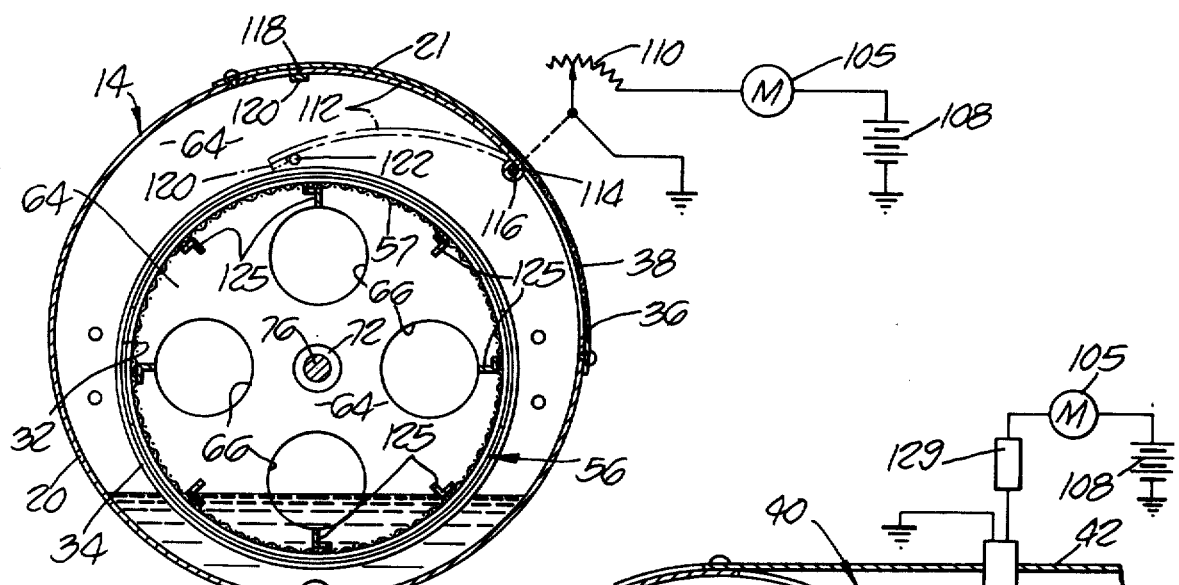
FIG. 5 is a view similar to FIG. 3 showing a different embodiment of the invention in which water lifting elements are affixed to the inner surfaces of the rotatable drum.

In FIG. 5 a second embodiment of the invention is illustrated. In this form of the invention all of the components of the apparatus are identical to those previously described with the exception that there has been added to drum 56 water lifting means for lifting water from the water bath contained in receptacle 14 upwardly into the path of the air flowing into the unit through inlet 36. The addition of the water lifting means permits the introduction of greater quantities of water particles into the air stream flowing through the unit than is possible with the drum alone. In the form of the invention shown in FIG. 5 the water lifting means is provided in the form of a plurality of elongated L-shaped members 125 affixed to the inner surface of drum 56 and extending longitudinally thereof. Members 125 may be constructed of light angle iron or of a plastic material.

As drum 56 rotates, members 125 function to entrap the water and lift it upwardly to a point above the axis of rotation of the drum where, due to the orientation of the lifting members 125, it will fall downwardly into the path of the air flowing through the drum. This means of adding water particles to the air flow has proven particularly advantageous when the apparatus of the invention is used in conjunction with large engines of the type found in trucks and other heavy equipment.

Figure 6:
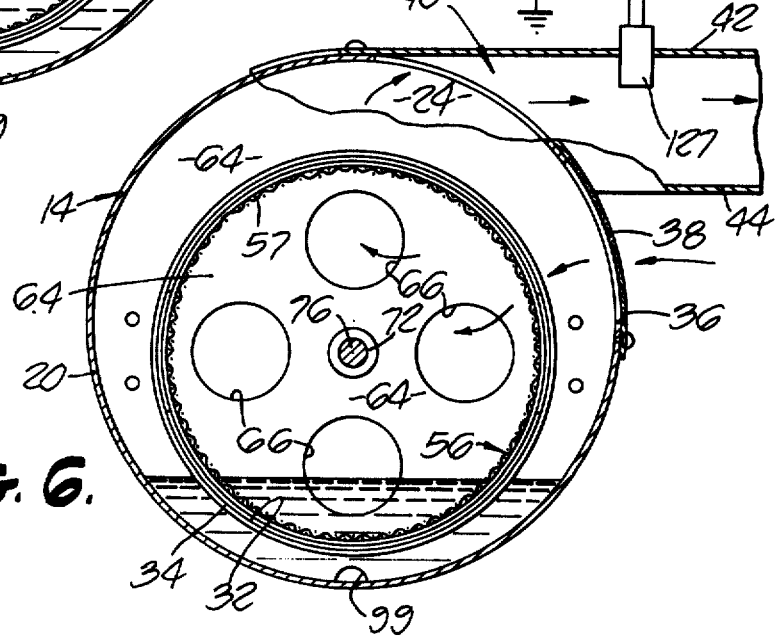
FIG. 6 is a fragmentary cross-sectional view similar to FIGS. 3 and 4 illustrating another form of the invention embodying a different type of sensor.

In FIG. 6 still another form or embodiment of the invention is illustrated. In this embodiment, the configuration of the apparatus is identical to that previously described except that a different type of sensor element is provided to sense the demand for humidified air by the carburetor and to cooperate with the control means for controlling the speed of rotation of the drum 56. This sensor element, which is placed in the path of flow of the air to the carburetor, is designated in FIG. 6 by the numeral 127. In this embodiment, the sensor element is shown as depending into duct 40, but it is to be appreciated that the element may be positioned in the path of the air flow at any point in the apparatus downstream of chamber 26. The sensor may be of any one of three basic types of sensors well known in the art. It may, for example, be an air pressure sensing element which senses variations in air pressure within the passageway, i.e., pressure increase or drop in duct 40 as a result of the varying demand for air by the carburetor. It may be a sensor which senses the rate of air flow flowing to the carburetor past the sensor, e.g., a point within duct 40; or it may be a sensor which senses the water content or degree of humidity of the air flowing past the sensor toward the carburetor. Each of these types of sensors are commercially available and can easily be adapted by a skilled mechanic to generate and transmit operating signals to the electrical circuit means corresponding to the variations in air pressure, rate of air flow or humidity as the case may be. As indicated schematically in FIG. 6, the sensor means is electrically coupled with the appropriate electrical circuit means generally designated by the numberal 129 numeral in turn is coupled with the motor in a manner so as to control the speed of rotation of the motor and in turn control the speed of rotation of drum 56 in relation to the varying signals generated by the sensor means. For certain applications, it may be desirable, as shown in FIG. 6, to eliminate the baffle element 56 from the apparatus and control the air flow impedence offered by the unit by other mechanical means or by specially sizing the apparatus for a particular engine application. In other applications it may be desirable to use a baffle element of the type previously described to control the path of the flow of air through the apparatus but use the separate sensor for governing the speed of rotation of the perforated drum.

OPERATION

With the apparatus of the invention securely affixed to the intake of the carburetor of an internal combustion engine, the reservoir 16, filled with water, and the appropriate weight 120 correctly selected for the particular engine involved, the apparatus is ready for operation. When the engine is started and while it is in an idling mode preparatory to starting the vehicle or otherwise loading the engine, the baffle element 56 will be in the at-rest position illustrated by the phantom lines in FIG. 3. Due to the demand for air by the carburetor, air will be drawn into the unit through opening 36 in receptacle 14, will strike baffle 112 and will be directed downwardly into drum 56 through perforated screen 57. As previously discussed, because of the close fit of the drum within flange 34 of wall 30 and due to the close proximity of edge 118 of the baffle with the periphery of the drum, substantially all of the air will flow inwardly into the drum along its length and within the area defined by arc A of FIG. 3. With the baffle in its lowered position maximum resistance will be offered by resistor 110 and the motor 105 will drive drum 56 at a low speed of rotation of on the order of 3 or 4 revolutions per minute. As the drum rotates, water particles will be picked up by screen 57 and will be carried into the path of the air flowing into the drum along its length and in the area defined by arc A. The air will move longitudinally within drum 56 carrying particles of water along with it and will flow into chamber 28 through openings 66 in end wall 30. Due to the relatively large volume of chamber 28 compared with the volume of the drum, chamber 28 acts as an expansion or precipitation chamber and the particles of free water carried by the air will be caused to precipitate out of the air and fall into the water contained in the lower portion of the chamber. The precipitation chamber 28 thus serves the important function of precipitating out from the air flow particles of raw water and preventing such particles from reaching the carburetor. The interaction of the air and the water particles as the intake air flows through the drum and into chamber 28, however, will both filter and effectively humidify the air so that the air flowing into passageway or duct 40 is clean and saturated with water vapor.

Upon acceleration of the engine, the demand for air by the carburetor will instantaneously increase causing a large influx of air to flow into the apparatus through opening 36. Unless the amount of water introduced into the air stream is immediately increased, the ability of the apparatus to properly filter and humidify the air will be seriously jeopardized. In order, therefore, to introduce additional water particles into the air stream, the speed of rotation of the drum must be increased so that additional water particles can be introduced into the air stream. This increase in speed of rotation is brought about by the cooperative interaction of the sensor means for sensing the demand for saturated air by the carburetor and the control means for controlling the speed of rotation of the drum. In the embodiment shown in FIG. 1-4 of the drawings, the sensor means, which is in the form of baffle 112, will be urged upwardly by the influx of air and will move pivotally about pin 116 into the position shown by the solid lines in FIG. 3. This pivotal movement will, in turn, operate variable resistor 110 so as to reduce the resistance offered to motor 105, thereby enabling it to drive drum 56 at a greater speed of rotation, and permit a faster rate of pick-up of water particles by screen 57. At the same time, movement of the free edge of baffle 112 away from drum 56 allows the air to flow into the drum through a much larger area thereby reducing the impedence to the air flow and at the same time more effectively cleaning and humidifying the air which flows into chamber 28 and thence through passageway 40 to the carburetor intake.

When the engine slows, the demand for air by the carburetor decreases and due to the urging of gravity, the baffle 112 will swing downwardly into chamber 26. This causes additional resistance to be offered to the motor so as to slow the speed of rotation of the drum and at the same time restricts the area of the drum through which the air may flow. In this way, the amount of water introduced into the flow of air is accurately and continuously controlled as a function of the amount of air flowing through the unit.

In the embodiment of the invention shown in FIG. 6, as has been previously described, during operation of the engine the sensor means senses the demand for water vapor saturated air by the carburetor and in cooperation with the control means of the invention regulates the speed of rotation of the drum in a manner similar to that just described.

When, as a result of the operation of the apparatus over a period of time, the water level in the receptacle 14 falls below a predetermined point, the float 92 will cause valve 90 to open so as to permit additional water to flow through conduit 18 into the receptacle from reservoir 16. All that must be done, therefore, to insure efficient and automatic operation of the apparatus is to occasionally fill reservoir 16 and to perform normal maintenance on the moving parts of the unit.

I claim:

1. An air filtering and humidifying apparatus in combination with an internal combustion engine, and said air filtering and humidifying apparatus including an adaptor means for operatively coupling the apparatus to the air intake of the carburetor of the internal combustion engine and further comprising: a. a receptacle for containing water, said receptacle comprising first and second communicating chambers, said first chamber being provided with an air intake opening;
- b. an air passageway interconnecting said second chamber of said receptacle and the air intake of the carburetor; and
- c. an air filtering and humidifying means for filtering and humidifying the stream of air flowing through the apparatus, said means comprising:
  1. a perforated drum rotatably mounted within said first chamber and interposed between said second chamber and the air intake of said first chamber, said drum being constructed and arranged so that as the drum rotates at least the periphery thereof is immersed in the water in said receptacle;
  2. sensor means for sensing the demand for humidified air at the intake of the carburetor, said sensor means comprising a sensor element disposed in the path of air flowing to the carburetor, said sensor element being adapted to sense the water content of the air flowing to the carburetor; and
  3. control means operatively interconnected with said sensor means and responsive thereto for controlling the speed of rotation of said perforated drum.

2. An air filtering and humidifying apparatus in combination with an internal combustion engine, and said air filtering and humidifying apparatus including an adaptor means for operatively coupling the apparatus to the air intake of the carburetor of the internal combustion engine and further, comprising:
- a a receptacle for containing water, said receptacle comprising first and second communicating chambers, said first chamber being provided with an air intake opening;
- b an air passageway interconnecting said second chamber of said receptacle and the air intake of the carburetor; and
- c. an air filtering and humidifying means for filtering and humidifying the stream of air flowing through the apparatus, said means comprising:
  1. a perforated drum rotatably mounted within said first chamber and interposed between second chamber and the air intake of said first chamber, said drum being constructed and arranged so that as the drum rotates at least the periphery thereof is immersed in the water in said receptacle;
  2. sensor means for sensing the demand or humidified air at the intake of the carburetor, said sensor means comprising a baffle element pivotally mounted within and extending longitudinally of said first chamber of said receptacle, said baffle element being so constructed and arranged as to be pivotally movable in response to an influx of air into said first chamber in such a manner that the free edge of said baffle will move into and out of juxtaposition with the periphery of said porous drum; and
  3. control means operatively interconnected with said sensor means and responsive thereto for controlling the speed of rotation of said perforated drum, said control means comprising:
     i. a driving means for rotatably driving said perforated drum, said driving means comprising an electric motor and a source of electricity; and
     ii. a regulating means for regulating the speed at which said driving means rotatably drives said perforated drum, said regulating means comprising electrical circuit means operatively coupled with and responsive to said sensor means for regulating the flow of current from the source of electricity to said electric motor, said electrical circuit means comprising a variable resistor operatively connected to said baffle element so that the resistance of said resistor is variable in response to the pivotal movement of said baffle element.

3. The apparatus as defined in claim 2 in which said receptacle is generally cylindrical and said porous drum comprises:
- a. generally circular inner and outer end walls, said inner end wall being provided with a plurality of openings communicating with said second chamber; and
- b. a perforated generally cylindrical screen-like body portion supported by said inner and outer end walls.

4. The apparatus as defined in claim 2 including:
- a. a water reservoir:
- b. a conduit interconnecing said water reservoir and said receptacle; and
- c. valve means for controlling the flow of water through said conduit so as to maintain a predetermined water level in said receptacle.

5. An air filtering and humidifying apparatus in combination with an internal combustion engine said air filtering and humidifying apparatus comprising:
- a. an adapter means for operatively coupling the apparatus to the air intake of the carburetor of the internal combustion engine;
- b. a receptacle for containing water, said receptacle comprising first and second communicating chambers, said first chamber being provided with an air intake opening;
- c. a duct forming an air passageway interconnecting said adapter means and said second chamber of said receptacle;
- d. a perforated drum rotatably mounted within said first chamber and interposed between said second chamber and the air intake of said first chamber;
- e. driving means for rotatably driving said perforated drum;
- f. a pivotally mounted baffle element extending longitudinally of said chamber of said receptacle, one edge of said baffle being pivotally connected to said receptacle adjacent the air intake opening therein and being so constructed and arranged as to normally depend inwardly into said first chamber into the path of air flowing into said chamber through the intake opening therein; and
- g. regulating means operatively interconnected with said baffle element and responsive the speed at which said driving means rotatably drives said drum.

6. The apparatus as defined in claim 5 including biasing means for urging the free edge of said baffle element into close proximity with the periphery of said perforated drum.

7. The apparatus as defined in claim 6 in which said biasing means comprises a weight removably affixed to the free edge of said baffle element.

8. The apparatus as defined in claim 5 including water lifting means affixed to said perforated drum for lifting water contained in said receptacle upwardly into the path of air flowing into said first chamber.

9. The apparatus as defined in claim 8 in which said water lifting means comprises a plurality of elongated angle members affixed to and extending longitudinally of said perforated drum.

10. An air filtering and humidifying apparatus in combination with an internal combustion engine said air filtering and humidifying apparatus comprising:
   a. an adapter means for operatively coupling the apparatus to the air intake of the carburetor of the internal combustion engine;
   b. a receptacle for containing water, said receptacle comprising first and second communicating chambers, said first chamber being provided with an air intake opening;
   c. a duct forming an air passageway interconnecting said adapter means and said second chamber of said receptacle;
   d. a perforated drum rotatable mounted within said first chamber and interposed between said second chamber and the air intake of said first chamber;
   e. an electric motor operatively coupled with a source of electricity and interconnected with said perforated drum;
   f. a pivotally mounted baffle element extending longitudinally of said chamber of said receptacle, one edge of said baffle being pivotally connected to said receptacle adjacent the air intake opening therein and being so constructed and arranged as to normally depend inwardly into said first chamber into the path of air flowing into said chamber through the intake opening therein;
   g. a variable resistor operatively interconnected with said baffle element and adapted to regulate the flow of current from the source of electricity to said electric motor in response to pivotal movement of said baffle element;
   h. a water reservoir affixed to said duct;
   i. a conduit interconnecting said water reservoir and said receptacle; and
   j. valve means for controlling the flow of water through said conduit so as to maintain a predetermined water level in said receptacle.

11. An air filtering and humidifying apparatus in combination with an internal combustion engine said air filtering and humidifying apparatus comprising:
   a. an adapter means for operatively coupling the apparatus to the air intake of the carburetor of the internal combustion engine;
   b. a receptacle for containing water, said receptacle comprising first and second communicating chambers, said first chamber being provided with an air intake opening;
   c. a duct forming an air passageway interconnecting said adapter means and said second chamber of said receptacle;
   d. humidifying means interposed in the path of the air stream flowing to the engine air intake for introducing water from the receptacle into the air flowing into the engine;
   e. a sensor element interposed in the path of the air stream flowing to the engine, said sensor element being adapted to sense the water content of the air flowing to the carburetor; and
   f. control means operatively interconnected with said humidifying means and with said sensor element and responsive to the latter for controlling said humidifying means to regulate the amount of water introduced thereby into the air flowing into the engine.

12. An air filtering and humidifying apparatus as defined in claim 11 in which said humidifying means comprises a perforated drum rotatably mounted within said first chamber and interposed between said second chamber and the air intake of said first chamber, and in which said control means comprises a driving means for rotatably driving said perforated drum and a regulating means for regulating the speed at which said driving means rotatably drives said perforated drum.

13. An air filtering and humidifying apparatus in combination with an interanl combustion engine said air filtering and humidifying apparatus comprising:
   a. an adapter means for operatively coupling the apparatus to the air intake of the carburetor of the internal combustion engine;
   b. a receptacle for containing water, said receptacle comprising first and second communicating chambers, said first chamber being provided with an air intake opening;
   c. a duct forming an air passageway interconnecting said adapter means and said second chamber of said receptacle;
   c. humidifying means interposed in the path of the air stream flowing to the engine air intake for introducing water from the receptacle into the air flowing into the engine;
   e. a pivotally mounted baffle element extending longitudinally of said first chamber of said receptacle, one edge of said baffle being pivotally connected to said receptacle adjacent the air intake opening therein and being so constructed and arranged as to normally depend inwardly into said first chamber into the path of air flowing into said chamber through the intake opening therein;
   f. control means operatively interconnected with said humidifying means and with said baffle element and responsive to pivotal movement of said baffle element for controlling the amount of water introduced by said humidifying means into the air flowing into the engine.

* * * * *